United States Patent
Mizes et al.

(10) Patent No.: US 9,044,960 B2
(45) Date of Patent: Jun. 2, 2015

(54) SPARSE TEST PATTERNS IN PRINTED DOCUMENTS FOR IDENTIFICATION OF INKJET AND PRINTHEAD PERFORMANCE IN A PRINTER

(71) Applicant: Xerox Corporation, Norwalk, CT (US)

(72) Inventors: Howard A. Mizes, Pittsford, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 8 days.

(21) Appl. No.: 13/680,545

(22) Filed: Nov. 19, 2012

(65) Prior Publication Data

US 2014/0139579 A1     May 22, 2014

(51) Int. Cl.
*B41J 2/21* (2006.01)
*G06K 15/02* (2006.01)
*B41J 29/393* (2006.01)

(52) U.S. Cl.
CPC ............ *B41J 2/2146* (2013.01); *G06K 15/027* (2013.01); *B41J 2/2142* (2013.01); *B41J 2029/3935* (2013.01)

(58) Field of Classification Search
USPC .................................................. 347/5, 9–15
See application file for complete search history.

(56) References Cited

U.S. PATENT DOCUMENTS

| | | | |
|---|---|---|---|
| 5,568,173 A | 10/1996 | Leenders et al. | |
| 6,726,302 B2 | 4/2004 | Yamada | |
| 6,764,155 B2 | 7/2004 | D'Souza et al. | |
| 7,100,508 B1 | 9/2006 | Mader | |
| 7,251,422 B2 | 7/2007 | Tokuyama et al. | |
| 7,511,857 B2 | 3/2009 | He et al. | |
| 7,965,414 B2 | 6/2011 | Wu et al. | |
| 8,118,391 B2 | 2/2012 | Snyder et al. | |
| 2002/0027674 A1* | 3/2002 | Tokunaga et al. | 358/1.14 |
| 2002/0113968 A1* | 8/2002 | Parisi et al. | 356/399 |
| 2007/0120885 A1 | 5/2007 | Jeong | |
| 2007/0158434 A1* | 7/2007 | Fan | 235/487 |
| 2008/0019611 A1 | 1/2008 | Larkin et al. | |
| 2008/0186340 A1* | 8/2008 | Koyama et al. | 347/9 |
| 2008/0266340 A1 | 10/2008 | Williams et al. | |
| 2008/0303854 A1 | 12/2008 | Mizes et al. | |
| 2010/0002028 A1* | 1/2010 | Kawaguchi et al. | 347/5 |
| 2010/0128320 A1* | 5/2010 | Fan et al. | 358/3.28 |
| 2011/0007371 A1 | 1/2011 | Yip et al. | |
| 2011/0074862 A1* | 3/2011 | Sasayama | 347/19 |
| 2011/0279504 A1* | 11/2011 | Mizes | 347/14 |

* cited by examiner

*Primary Examiner* — Geoffrey Mruk
*Assistant Examiner* — Scott A Richmond
(74) *Attorney, Agent, or Firm* — Maginot Moore & Beck LLP

(57) ABSTRACT

A method for operating an inkjet printer to identify inoperable inkjets includes ejecting ink drops of a first color onto an image receiving surface to impose a control pattern on a document zone in addition to an ink image generated in the document zone. A density of the control pattern in the document zone changes at a rate that is at or less than a predetermined threshold. The method includes generating scanned image data of a portion of the control pattern on the image receiving surface and identifying a performance parameter corresponding to inkjets and printheads in the printer.

26 Claims, 8 Drawing Sheets

SPARSE TEST PATTERNS IN PRINTED DOCUMENTS FOR IDENTIFICATION OF INKJET AND PRINTHEAD PERFORMANCE IN A PRINTER

TECHNICAL FIELD

This disclosure relates generally to identification of printed patterns formed by inkjets in one or more printheads in a printer, and, more particularly, to analysis of image data to identify performance parameters in inkjets and printheads in the printer.

BACKGROUND

A typical inkjet printer uses one or more printheads to form an ink image on an image receiving surface. Each printhead typically contains an array of individual nozzles for ejecting drops of ink across an open gap to an image receiving surface to form an image. The image receiving surface may be a continuous web of recording media, a series of media sheets, or the image receiving surface may be a rotating surface, such as a print drum or endless belt. Images printed on a rotating surface are later transferred to recording media by mechanical force in a transfix nip formed by the rotating surface and a transfix roller. In an inkjet printhead, individual piezoelectric, thermal, or acoustic actuators generate mechanical forces that eject ink through an orifice from an ink filled conduit in response to an electrical voltage signal, sometimes called a firing signal. The magnitude, frequency, and/or duration of the firing signals affect the amount of ink ejected in each drop. The firing signal is generated by a printhead controller in accordance with image data. An inkjet printer forms an ink image with reference to electronic image data by printing a pattern of individual ink drops at particular locations on the image receiving surface. The locations where the ink drops landed are sometimes called "ink drop locations," "ink drop positions," or "pixels." Thus, a printing operation can be viewed as the placement of ink drops on an image receiving surface with reference to the electronic image data.

In order for the printed ink images to correspond closely to the image data, both in terms of fidelity to the image objects and the colors represented by the image data, the printheads must be registered with reference to the imaging surface and with the other printheads in the printer. Registration of printheads is a process in which the printheads are operated to eject ink in a known pattern and then the printed image of the ejected ink is analyzed to determine the orientation of a printhead with reference to the imaging surface and with reference to the other printheads in the printer. Operating the printheads in a printer to eject ink in correspondence with image data presumes that the printheads are level with a width across the image receiving surface and that all of the inkjet ejectors in the printhead are operational. The presumptions regarding the orientations of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions.

Analysis of printed images is performed with reference to two directions. "Process direction" refers to the direction in which the image receiving surface is moving as the imaging surface passes the printhead to receive the ejected ink and "cross-process direction" refers to the direction across the width of the image receiving surface. In order to analyze a printed image, a test pattern needs to be generated so determinations can be made as to whether the inkjets operated to eject ink did, in fact, eject ink and whether the ejected ink landed where the ink would have landed if the printhead was oriented correctly with reference to the image receiving surface and the other printheads in the printer. In some printing systems, an image of a printed test pattern is generated by using image data of a test pattern to eject ink onto media or by transferring such a printed test pattern from an image receiving surface onto media, discharging the media from the system, and then scanning the image with a flatbed scanner or other known offline imaging device. This method of generating image data of the printed test pattern suffers from the inability to analyze the test pattern in situ and from the inaccuracies imposed by the external scanner.

In some printers, the ink drops that form the test pattern are printed directly onto a print medium such as an elongated paper web. The test patterns are formed in "inter-document zones," which are gaps between printed pages on the web. In some embodiments, the inter-document zones are later removed from the finished printed material with cutting devices. In a cut-sheet printer, however, each printed sheet includes an ink image and the test pattern cannot be easily removed from each individual sheet through a cutting process. Instead, the printer transfers ink drops forming test patterns onto the same sheets that receive printed images. The test patterns can negatively impact the quality of the images that are printed on the sheets or on the sheets of paper web printers where the inter-document zones are not removed after the printing process. Consequently, improvements to printers to enable detection of inoperable inkjets and register printheads while maintaining the quality of printed images would be beneficial.

SUMMARY

In one embodiment, a method for operating an inkjet printer to identifying inoperable inkjets has been developed. The method includes operating a plurality of inkjets to eject ink drops of a first color onto an image receiving surface to impose a control pattern on a document zone on the image receiving surface in addition to an ink image generated in the document zone with reference to electronic image data, a density of the control pattern in the document zone being configured to change at a rate that is at or less than a predetermined threshold, generating scanned image data of a portion of the control pattern on the image receiving surface, and identifying with reference to the generated scanned image data a performance parameter corresponding to an inkjet in the plurality of inkjets or a printhead including at least one inkjet in the plurality of inkjets.

In one embodiment, an inkjet printer that is configured to identifying inoperable inkjets during a print job has been developed. The inkjet printer includes a plurality of inkjets configured to eject ink drops onto an image receiving surface, an optical sensor configured to generate scanned image data corresponding to light reflected from the image receiving surface and ink drops on the image receiving surface, and a controller operatively connected to the plurality of inkjets and the optical sensor. The controller is configured to generate a plurality of firing signals for the plurality of inkjets to eject ink drops of a first color onto the image receiving surface to impose a control pattern on a document zone on the image receiving surface in addition to an ink image generated in the document zone with reference to electronic image data, a density of the control pattern in the document zone being configured to change at a rate that is at or less than a predetermined threshold, generate scanned image data of a portion of the control pattern on the image receiving surface with the optical sensor, and identify with reference to the generated scanned image data a performance parameter corresponding to an inkjet in the plurality of inkjets or a printhead including at least one inkjet in the plurality of inkjets.

BRIEF DESCRIPTION OF THE DRAWINGS

The foregoing aspects and other features of a printer that generates a sparse test pattern in printed documents for detection of inoperable inkjets are explained in the following description, taken in connection with the accompanying drawings.

DETAILED DESCRIPTION

Figure 1:
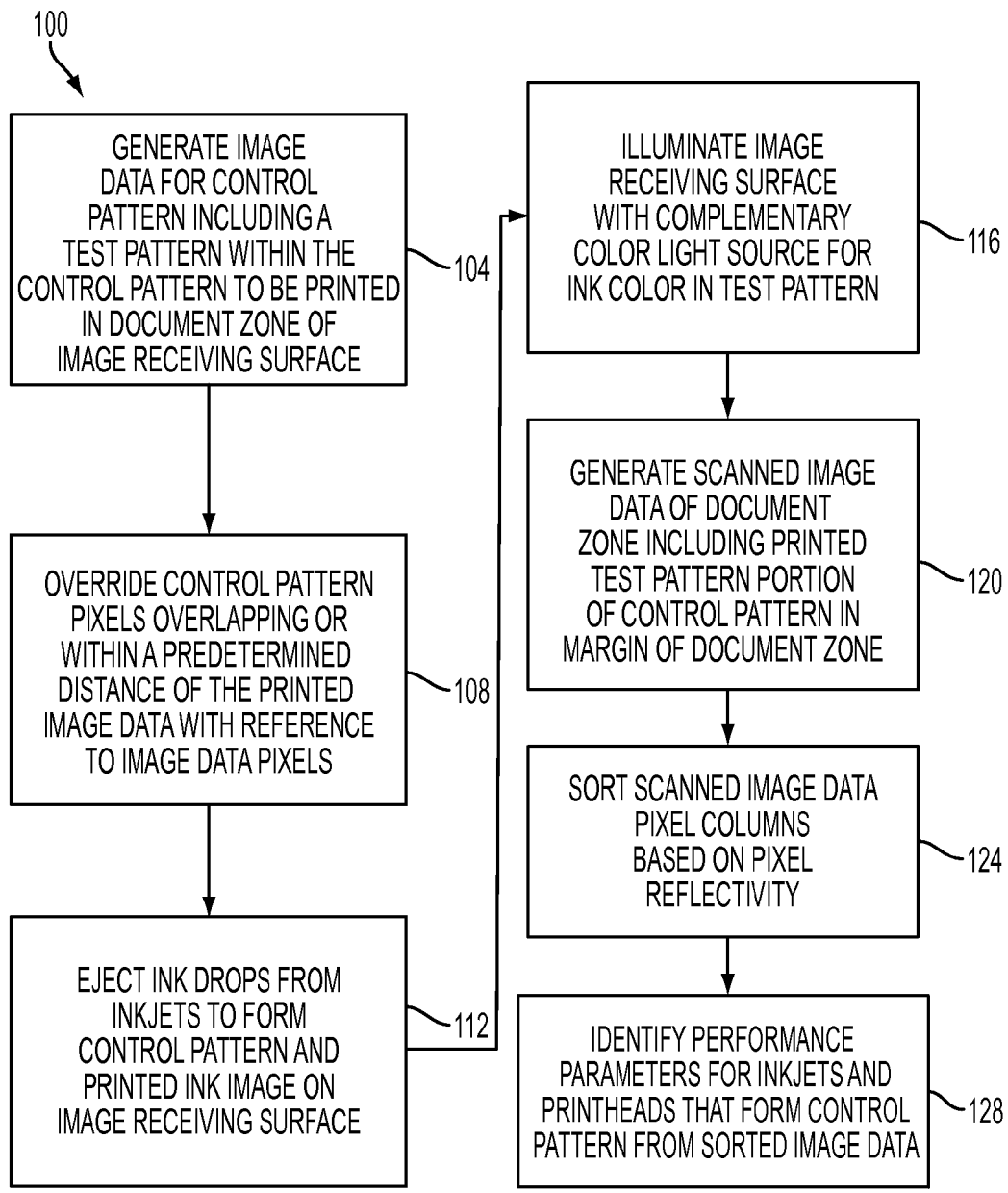
FIG. 1 is a block diagram of a process for identifying an inoperable inkjet in a printed pattern of ink drops formed in a margin of a document zone during a printing operation.

As used herein, the term "image receiving member" refers to an object with a surface that receives printed ink drops in an inkjet printer. The term "image receiving surface" refers to a portion of the image receiving member that receives the ink drops that are ejected from a plurality of inkjets in one or more printheads in the printer. An indirect image receiving member, such as a rotating drum or belt, has an image receiving surface that receives ink drops that are ejected from the inkjets and are subsequently transferred and fixed to a surface of a print medium, such as a sheet of paper, in a "transfixing" processing that is known to the art. In the indirect printer, the print medium is also an image receiving member with an image receiving surface that bears the ink drops that are transfixed from the indirect image receiving member. In a direct inkjet printer, the print medium is the image receiving member and the inkjets print ink drops directly onto the surface of the print medium.

As used herein, the term "document zone" refers to a portion of an image receiving surface that can receive ink drops during a printing operation. In some configurations, the document zone includes a region in which a printed ink image is formed during a print job and margins that are formed around the printed ink image that are left blank. For example, in a page of printed text the entire surface of the page is the document zone, but the page typically includes margins around the printed text that do not include the printed text. As described below, ink drops that form a control pattern and a test pattern are printed in the portions of the document zone corresponding to the margins of the page and in the region of the document zone corresponding to the printed image.

As used herein, the term "ink" refers to phase-change inks, or other known forms of ink, such as aqueous inks, ultraviolet (UV) inks, ink emulsions, ink suspensions, ink solutions, or the like. In an inkjet printer a plurality of inkjets eject liquid drops of ink onto the image receiving surface during a printing operation. In a phase-change or gel ink printer, the printer elevates the temperature of the ink to melt an ink that is solid or gelatinous at room temperature into a liquid phase for printing. The drops of phase-change ink cool and solidify after being transfixed to the surface of the print medium. For aqueous and solvent based inks, water or a volatile solvent evaporate after the ink drops are transferred to the print medium to form the printed image.

As used herein, the term "performance parameter" refers to a metric that corresponds to an operational characteristic of an inkjet or a printhead that includes a plurality of inkjets in an inkjet printer that is identified with reference to image data that correspond to the control pattern of ink drops that are formed by the inkjets and printheads. One type of performance parameter refers to the operability or inoperability of an inkjet. For example, if an inkjet in the printer is inoperable, then a corresponding ink drop or ink drops in a predetermined control pattern corresponding to the inkjet are absent from the image data generated from the control pattern as printed on the image receiving surface. Other performance parameters that correspond to individual inkjets or groups of inkjets include, but are not limited to, intensity measurements and dot spread temperature control in the image data corresponding to ink drops that are printed in the control pattern. Another type of performance parameter refers to the registration of printheads in the cross-process direction and process direction in the printer. For example, if a control pattern includes ink drops from inkjets that are formed in two different printheads, then the relative distances between the ink drops from the two printheads in the cross-process direction and the process direction are used to identify registration offsets between the two printheads.

Figure 8:
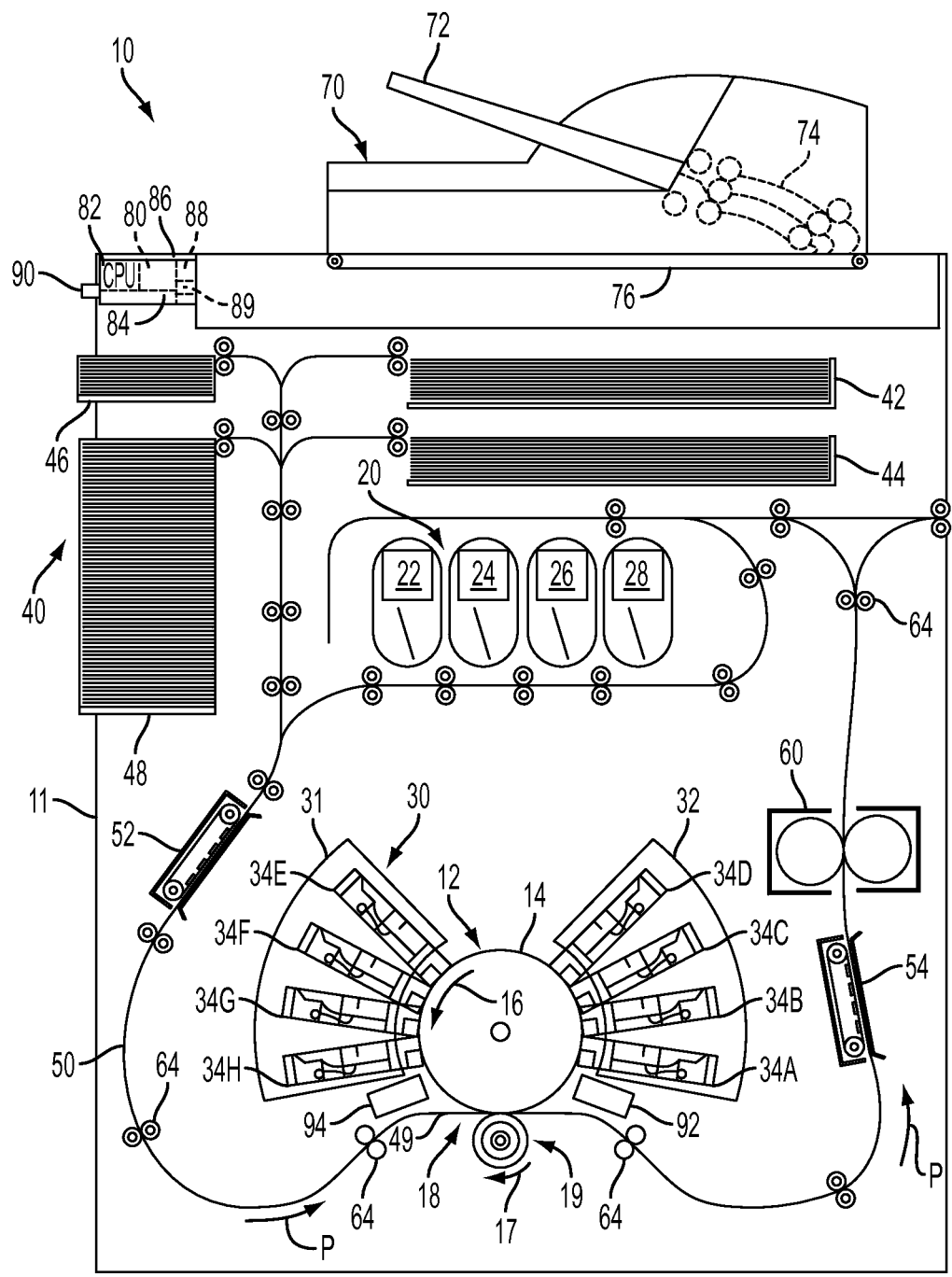
FIG. 8 is a schematic diagram of a prior art inkjet printer.

FIG. 8 illustrates a high-speed phase change ink image producing machine or printer 10. As illustrated, the printer 10 includes a frame 11 supporting directly or indirectly operating subsystems and components, as described below. The printer 10 includes an image receiving member 12 that is shown in the form of a drum, but can also include a supported endless belt. The image receiving member 12 has an imaging surface 14 that is movable in a direction 16, and on which phase change ink images are formed. A transfix roller 19 rotatable in the direction 17 is loaded against the surface 14 of drum 12 to form a transfix nip 18, within which ink images formed on the surface 14 are transfixed onto a media sheet 49.

The high-speed phase change ink printer 10 also includes a phase change ink delivery subsystem 20 that has at least one source 22 of one color phase change ink in solid form. Since the phase change ink printer 10 is a multicolor image producing machine, the ink delivery system 20 includes four (4) sources 22, 24, 26, 28, representing four (4) different colors CYMK (cyan, yellow, magenta, black) of phase change inks. The phase change ink delivery system also includes a melting and control apparatus (not shown) for melting or phase changing the solid form of the phase change ink into a liquid form. The phase change ink delivery system is suitable for supplying the liquid form to a printhead system 30.

In this embodiment, the printhead system 30 includes a first printhead support 31 and a second printhead support 32 each of which provides support for a plurality of printhead modules, also known as print box units 34A through 34H. Each printhead module 34A-34H effectively extends across the width of the media and deposits ink onto the surface 14 of the image receiving member 12. A printhead module can include a single printhead or a plurality of printheads in a staggered arrangement that are operatively connected to a frame (not shown) and aligned to deposit the ink to form an ink image on the surface 14. The printhead modules 34A-34H can include associated electronics, ink reservoirs, and ink conduits to supply ink to the one or more printheads. In this embodiment however conduits (not shown) operatively connect the sources 22, 24, 26, and 28 to the printhead modules 34A-34H to provide a supply of ink to the one or more printheads in the module. As is generally familiar, the one or more printheads of a printhead module eject a single color of ink. Typically, the printheads of one printhead module are offset by a distance that is one-half the distance between nozzles in a printhead from the printheads of another printhead module that ejects the same color of ink. This arrangement enables the two printhead modules to print at a higher resolution than the resolution provided by a single printhead module. By arranging a pair of printhead modules in this manner for each color of ink used in a CMYK printer, each color can be printed at the higher resolution. For instance, printhead modules 34A and 34B can deposit cyan ink, modules 34C and 34D can deposit magenta ink, modules 34E and 34F can deposit yellow ink, and modules 34G and 34H can deposit block. By offsetting or staggering the two printhead modules printing with the same color of ink the resolution of a color separation can be increased from, for example, 300 dpi, the resolution printed by a single printhead module, to 600 dpi, the resolution printed by the pair of modules ejecting the same color. Although the printer 10 includes eight printhead modules 34A-34H, alternative configurations include a different number of printhead modules.

As further shown, the phase change ink printer 10 includes a recording media supply and handling system 40 that stores, for example, one or more stacks of paper media sheets of various sizes. The recording media supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut media sheets 49, for example. The recording media supply and handling system 40 also includes a substrate handling and transport system 50 that has a substrate heater or pre-heater assembly 52 and a substrate and image heater 54. The printer 10 includes an optional fusing device 60 to apply additional heat and pressure to the print medium after the print medium passes through the transfix nip 18. In one embodiment, the fusing device 60 adjusts a gloss level of the printed images that are formed on the print medium. In the embodiment of FIG. 8, the phase change ink printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the image receiving member 12, the printhead modules 34A-34H (and thus the printheads), the substrate supply and handling system 40, and the substrate handling and transport system 50. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34H. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the processes, described more fully below, that enable the printer to perform drum maintenance unit (DMU) maintenance procedures and DMU cycles selectively. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image data for an image to be produced are sent to the controller 80 from either the scanning system 76 or via the online or work station connection 90 for processing and output to the printhead modules 34A-34H. Additionally, the controller 80 determines and/or accepts related subsystem and component controls, for example, from operator inputs via the user interface 86, and accordingly executes such controls. As a result, solid forms of phase change ink for appropriate colors are melted and delivered to the printhead modules 34A-34H. Additionally, pixel placement control is exercised relative to the imaging surface 14 thus forming desired images per such image data, and receiving substrates, which can be in the form of media sheets 49, are supplied by any one of the sources 42, 44, 46, 48 and handled by recording media transport system 50 in timed registration with image formation on the surface 14. Finally, the image is transferred from the surface 14 and fixedly fused to the image substrate within the transfix nip 18.

In some printing operations, a single ink image can cover the entire surface of the image receiving member 12 (single pitch) or a plurality of ink images can be deposited on the image receiving member 12 (multi-pitch). Furthermore, the ink images can be deposited in a single pass (single pass method), or the images can be deposited in a plurality of passes (multi-pass method). When images are deposited on the image receiving member 12 according to the multi-pass method, under control of the controller 80, a portion of the image is deposited by the printheads within the printhead modules 34 during rotation of the image receiving member 12.

In one type of printing architecture, images can be prepared by accumulating multiple color separations. During rotation of the image receiving member 12, ink droplets for one of the color separations are ejected from the printheads and deposited on the surface 14 of the image receiving member 12. Subsequent color separations are printed on the surface 14 until the last color separation is deposited to complete the image. In some cases, for example cases in which secondary or tertiary colors are used; one ink droplet or pixel can be placed on top of another one, as in a stack. Another type printing architecture generates images from multiple swaths of ink droplets ejected from the print heads. During rotation of the image receiving member 12, ink droplets for one of the swaths (each containing a combination of all of the colors) are applied to the surface of the image receiving member 12 until the last swath is applied to complete the ink image. Both of these examples of multi-pass architectures perform what is commonly known as "page printing." Each image comprised of the various component images represents a full sheet of information worth of ink droplets which, as described below, is then transferred from the image receiving member 12 to a media sheet, such as the media sheet 49.

In a multi-pitch printing architecture, the surface of the image receiving member can be partitioned into multiple segments, each segment including a full page image in a document zone (i.e., a single pitch) and interdocument zones that separate multiple pitches formed on the image receiving member 12. For example, a two pitch image receiving member includes two document zones that are separated by two interdocument zones around the circumference of the image receiving member 12. Likewise, for example, a four pitch image receiving member includes four document zones, each corresponding to an ink image formed on a single media sheet, during a pass or revolution of the image receiving member 12.

Once an image or images have been printed on the image receiving member 12 under control of the controller 80 in accordance with an imaging method, such as the single pass method or a multi-pass method, the exemplary inkjet printer 10 begins a process for transferring and fixing the image or images at the transfix roller 19 from the image receiving member 12 onto the media sheet 49. In the printer 10, the controller 80 operates the media transport system 50 to move the media sheet 49 in the process direction to a position adjacent the transfix roller 19 and then through the transfix nip 18 between the transfix roller 19 and image receiving member 12. The transfix roller 19 applies pressure against the back side of the recording media 49 in order to press the front side of the recording media 49 against the image receiving member 12. Although the transfix roller 19 can also be heated, in the exemplary embodiment of FIG. 8, the transfix roller 19 is unheated. Instead, the pre-heater assembly 52 for the media sheet 49 is provided in the media path leading to the nip. The pre-heater assembly 52 provides the necessary heat to the media sheet 49 for subsequent aid in transfixing the image to the media, thus simplifying the design of the transfix roller. The pressure produced by the transfix roller 19 on the back side of the heated media sheet 49 facilitates the transfixing (transfer and fusing) of the image from the image receiving member 12 onto the media sheet 49.

The rotation or rolling of both the image receiving member 12 and transfix roller 19 not only transfixes the images onto the media sheet 49, but also assists in transporting the media sheet 49 through the nip. The image receiving member 12 continues to rotate to continue the transfix process for the images previously applied to the surface 14 of the image receiving member 12. The controller 80 operates a drum maintenance unit (DMU) 92 that removes residual ink left on the image receiving member 12 after the ink images are transfixed to the media sheet.

The DMU 92 can include a release agent applicator, a metering blade, and, in some embodiments, a cleaning blade. The release agent applicator can further include a reservoir having a fixed volume of release agent such as, for example, silicone oil, and a resilient donor roller, which can be smooth or porous and is rotatably mounted in the reservoir for contact with the release agent and the metering blade. The release agent forms a thin layer on the image receiving surface 14 that prevents adhesion of ink drops that are ejected from the printhead modules 34A-34B to the image receiving member 14. Instead, a large majority of the ink drops are transferred to the media sheet during the transfix operation, while a cleaning blade in the DMU 92 removes a small number of ink drops that adhere to the image receiving member 12 after the transfix operation. The DMU 92 is operably connected to the controller 80 such that the donor roller, metering blade and cleaning blade are selectively moved by the controller 80 into temporary contact with the rotating image receiving member 12 to deposit and distribute release agent onto and remove un-transferred ink pixels from the surface of the member 12.

The printer 10 includes an optical sensor 94 that is configured to detect light reflected from the image receiving member 12, including ink drops that are formed on the image receiving surface 14, as the image receiving member 12 approaches the transfix nip 18. The optical sensor 94 includes a linear array of individual optical detectors that are arranged in the cross-process direction across the image receiving member 12. The optical sensor 94 generates digital image data corresponding to light that is reflected from the image receiving surface 14. The optical sensor 94 is arranged to detect light reflected from the image receiving member 12 and ink drops on the image receiving surface 14. The optical sensor 94 generates a series of rows of image data, which are referred to as "scanlines" as the image receiving member 12 rotates in the direction 16 past the optical sensor 94. In one embodiment, each optical detector in the optical sensor 94 further comprises three sensing elements that are sensitive to frequencies of light corresponding to red, green, and blue (RGB) reflected light colors. The optical sensor 94 also includes illumination sources that shine red, green, and blue light onto the image receiving surface 14. As described below, the optical sensor 94 shines complementary colors of light onto the image receiving surface to enable detection of different ink colors using the RGB elements in each of the photodetectors. In an alternative embodiment, the optical sensor is located from the transfix nip 18 in the process direction and detects light reflected from the surface of a printed media sheet, including the printed ink drops that are transfixed to the media sheet.

As described below in the discussion of processes 100 and 200, the printer 10 is configured to eject ink drops corresponding to sparse patterns on the image receiving surface of 14 of the image receiving member 12 during a printing operation. The ink drops in the sparse patterns are formed in one or more of the document zones on the image receiving surface 14, and are either transfixed to a media sheet such as the media sheet 49, or are removed from the image receiving member by the DMU 92 as the image receiving member rotates in direction 16. The controller 80 operates the printhead modules 34A-34D and the media transport system 50 to ensure that ink drops on the image receiving surface 14 do not pass through the transfix nip 18 in the absence of a media sheet.

One reason to avoid printing ink drops in a sparse pattern in the interdocument zones that are outside the document zone is that ink drops formed outside the document zone produce image defects in subsequent pages. If ink drops formed on the image receiving surface pass through the nip 18 without a media sheet between the image receiving member 12 and the transfix roller 19, then the ink drops may transfer to the transfix roller 19. In a subsequent rotation of the transfix roller 19, the transferred ink drops are either transfixed to another media sheet, which introduces image defects on the surface of the media sheet, or the ink drops transfer back to the image receiving member 12 and contaminate the image receiving surface 14. The controller 80 selects locations for printing ink drops on the image receiving member 12 to ensure that ink drops remain within the document zones to prevent transfer of ink drops to the transfix roller 19.

Another reason to avoid printing ink drops in a sparse pattern in the interdocument zones that are outside the document zone is that some printer embodiments with optical sensors that detect ink drops on a printed media sheet cannot detect ink drops that are formed outside of the document zone where the media sheet engages the image receiving member. For example, as described above the optical sensor 94 is configured to scan the surface of the media sheet 49 after the media sheet 49 passes through the transfix nip 18 in an alternative embodiment. Each ink drop that is located on the image receiving surface 14 outside of the document zone fails to transfer to the media sheet 49 and cannot be detected by the optical sensor.

FIG. 1 depicts a process 100 for identifying one or more performance parameters for inkjets and printheads in an inkjet printer during a print job. In the description below, a reference to the process 100 performing or doing some function or action refers to one or more controllers or processors that are configured with programmed instructions to implement the process performing the function or action or operating one or more components to perform the function or action. Process 100 is described with reference to the printer 10 of FIG. 8 for illustrative purposes.

Process 100 begins with generation of digital image data corresponding to a control pattern that is printed onto the image receiving surface in conjunction with image data corresponding to a standard printed image that is formed as part of a print job (block 104). For example, in the printer 10, the controller 80 processes image data corresponding to a printed ink image that is formed on the image receiving surface 14 of the drum 12 and subsequently transfixed to a print medium. The printed ink image includes, for example, text and graphics that are formed from ink drops of one or more of the CMYK inks from the printhead modules 34A-34H. The control pattern is a low-density configuration of pixels that are distributed across the document zone, including regions that overlap the printed image and margins around the printed image.

A subset of the pixels in the digital data corresponding to the control pattern in the margin region forms a test pattern. In the process 100, the test pattern includes individual ink drops or sequences of ink drops that are ejected from different inkjets in one or more printheads in the print zone. The test pattern includes individual ink drops or sequences of ink drops from selected inkjets in the printhead modules 34A-34H. If an ink drop is absent from the test pattern, then the corresponding inkjet that is responsible for ejecting the absent ink drop is identified as an inoperable inkjet. In one embodiment, the electronic storage device 84 in the controller 80 stores image data corresponding to one or more predetermined control patterns, with each control pattern including pixels corresponding to a test pattern. In another embodiment, the controller 80 generates the image data for a sequence of control patterns in a pseudo-random manner to ensure that the set of test patterns generate include pixels corresponding to each of the selected inkjets in the printheads and that the control pattern is formed with a predetermined density and sparse distribution.

As described above the image data for the control pattern, which includes the pixels in the test pattern, is a low-density pattern. As used herein, the term "low-density" refers to the number and distribution of ink drops in the control pattern. For example, in one embodiment the image data corresponding to the control pattern occupy approximately 0.12% of the total number of pixels that correspond to the document zone. Thus, for image data at a resolution of 600 dots per inch (DPI) in a document zone that corresponds to a size A4 media sheet (8.27 in×11.69 in), the control pattern includes approximately 41,800 activated pixels that are distributed over a grid of approximately 34.8 million pixels in the document zone corresponding to the entire media sheet. Additionally, the pixels in the control pattern are distributed in a sparse arrangement across the document zone, where ink drops from separate ejectors that are formed as part of the control pattern are spaced apart from each other instead of being grouped together on the image receiving surface. In one embodiment of a multi-color printer, such as the CMYK printer 10, the control pattern image data include pixels corresponding to ink drops of each of the CMYK ink colors.

Figure 3:
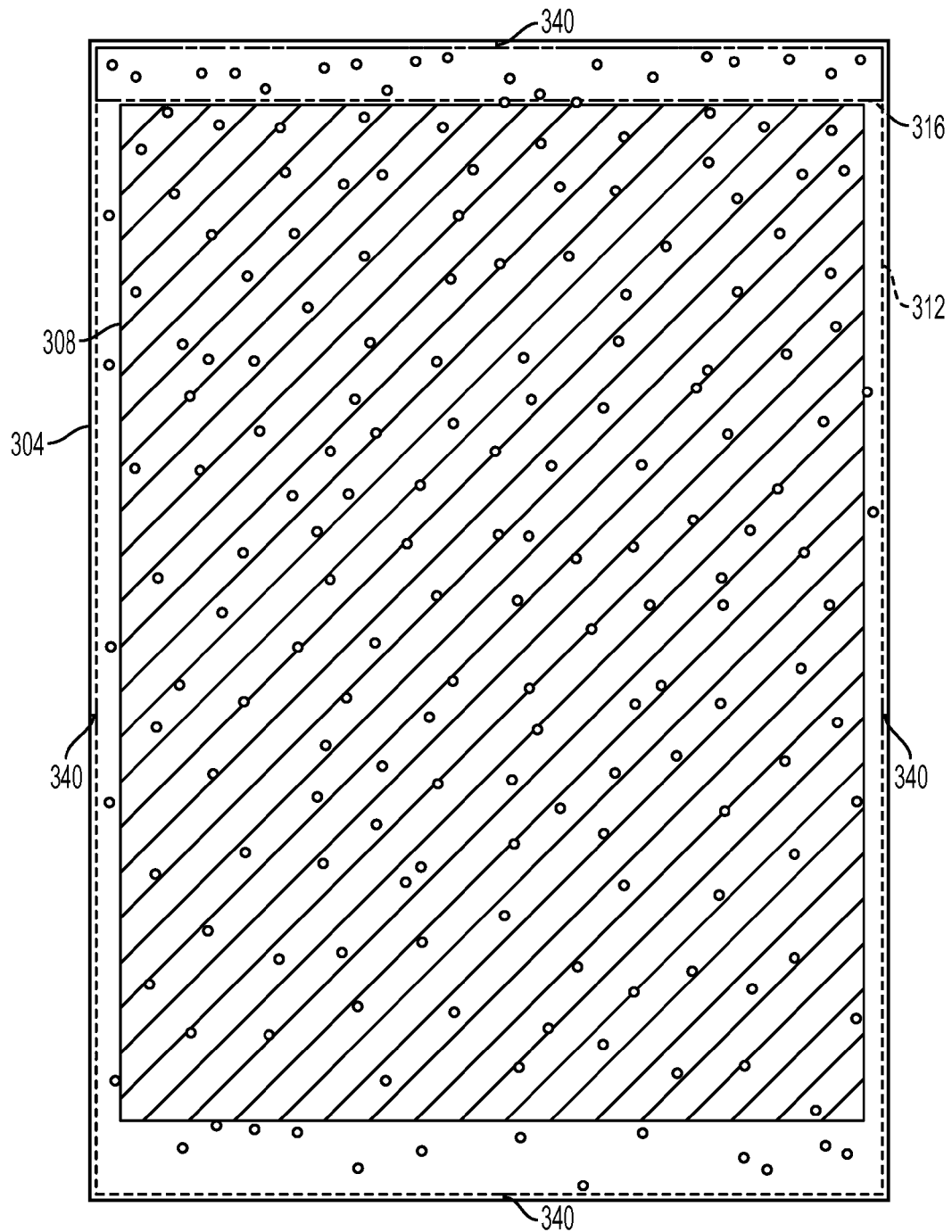
FIG. 3 is a diagram depicting a control pattern including image data corresponding to ink drops formed on a document zone that includes a test pattern formed in a margin and a printed ink image.

FIG. 3 depicts a document zone 304 that is formed on the image receiving member 12 with a control pattern and printed image. In FIG. 3, the document zone 304 corresponds to a region of the image receiving member 12 that has the same dimensions as a media sheet, such as the media sheet 49. During a print job, the printer 10 forms a printed ink image 308 on the document zone 304 and subsequently transfixes the printed ink image 308 to the media sheet. In FIG. 3, the control pattern 312 includes ink drops that are distributed across a large proportion of the document zone 304, including the top and bottom margins. In FIG. 3, control pattern 312, including the portion of the control pattern that forms the test pattern in the region 316, extends closer to the edge of the paper than the printed ink image 308. While the control pattern 312 covers a large proportion of the document zone 304, the controller 80 generates the controller pattern 312 with a small gap, which is indicated by the dimension lines 340 in FIG. 3, between the edges of the control pattern and the edges of the document zone 304. In one embodiment, the gap is approximately 2 mm on each side of the control pattern 312. The gap ensures that ink drops in the control pattern 312 and test pattern 316 remain within the document zone 304 and are transferred to a print medium during the transfix process instead of transferring from the image receiving surface 14 to the transfix roller 19 if the ink drops are ejected at locations outside of the document zone 304.

The image data in the control pattern 312 are arranged so that the printhead modules 34A-34H eject the ink drops in the control pattern 312 within the document zone 304. Since a print medium engages the entire document zone 304 during the transfix operation, the ink drops in the control pattern 312 are not transferred to the transfix roller 19 as the image receiving member 12 rotates through the transfix nip 18. In FIG. 3, the region 316 in the larger control pattern 312 includes ink drops that are part of the test pattern, although the control pattern 312 can include ink drops in the region 316 that are not part of the test pattern as well. In the embodiment of FIG. 3, the control pattern 312 has a substantially uniform density across the document zone 304. The region 316 is located entirely in the margin of the document zone 304 outside of the printed image 308. While the test pattern in FIG. 3 is located in the top margin 316, in another embodiment the test pattern is located in the bottom page margin or is located in both the top and bottom margins.

In another embodiment, the image data corresponding to the control pattern 312 are generated with a density gradient instead of with the uniform density depicted in FIG. 3. For example, in an alternative configuration the density of the control pattern 312 corresponds to the density of the test pattern in the margin 316 near the top of the document zone 304 to reduce the perceptibility of the test pattern. The density of ink drops in the control pattern 312 gradually drops toward the bottom of the document zone 304. The controller 80 generates image data for the control pattern 312 to set the rate of change in the density in the control pattern 312 below a predetermined threshold where the change in control pattern density becomes perceptible to human observers. Because the density of the control pattern 312 changes gradually and because the ink image 308 has a much higher perceptibility than the control pattern 312, the gradual change in control pattern density is either imperceptible or has a low perceptibility to the human eye.

As depicted in FIG. 3, the image data in the control pattern region 312 include pixels that are distributed over a large section of the document zone 304 up to a predetermined distance from the edges of the document zone 304. The test pattern in region 316 only includes a portion of the ink drops in the control pattern 312, and the majority of the ink drops in the control pattern 312 are not used to identify inoperable inkjets during process 100. Instead, the purpose of the ink drops in the control pattern 312 that are not part of the test pattern 316 is to reduce the perceptibility of the printed ink drops in the test pattern to the human eye. While printing additional ink drops to reduce the visibility of the test pattern may appear to be counter-intuitive, the sparse control pattern 312 actually reduces the perceptible visibility of the ink drops in the margin 316 because human vision is sensitive to the spatial rate of change of densities more so than absolute densities.

For example, the human eye is sensitive to the spatial frequency of printed densities with the most sensitive variation in the 2-5 cycle/degree range (which is in the range of 2-3 mm distance at nominal reading distance). At much longer and shorter density variation distances the eye response becomes significantly less sensitive. Consequently, a small enough single drop of black ink on a sheet might not be perceptible, but a grouping of black ink drops in the millimeter size is easily perceptible to most human observers. Similarly single drops in very large groupings such as the entire page become invisible and are merely perceived as light densities. If the number of pixels in the image data that are selected to be part of the control pattern is below a perceptibility limit, then the pattern formed with the light density becomes imperceptible to an ordinary human observer. Thus, if the entire printed sheet is covered in ink drops with a sufficiently low density and/or that this low density is varying at a low enough spatial rate, then the human eye only perceives a blank sheet of paper that is slightly darker than the white media sheet before the low-density control pattern is printed on the page. If each page in a print job is formed with a low-density control, then a human eye does not effectively perceive the low-density control pattern unless the sheets are compared to a blank white sheet. Additionally, since each sheet includes a printed ink image that is intentionally formed to have a high-perceptibility, the low-density control pattern 312, including the test pattern ink drops in the margin region 316, is effectively imperceptible to the human eye. If, on the other hand, there is a sharp contrast or density change then even a relatively low density grouping of drops becomes visually perceptible. For example, if the low density region 316 included no ink drops while the remainder of the control pattern region 312 included the ink drops arranged in the sparse control pattern, then the sharp drop in density between the regions 312 and 316 would be visually perceptible.

During process 100, the image data that form the control pattern also include the test pattern. In one embodiment of process 100, the test pattern image data include one pixel for each of a plurality of inkjets in the print zone. In one embodiment, each test pattern includes pixels corresponding to only a portion of the inkjets in the print zone, and the controller 80 forms multiple test patterns in the document zones of multiple printed pages during a print job to test each inkjet in the print zone.

Figure 5:
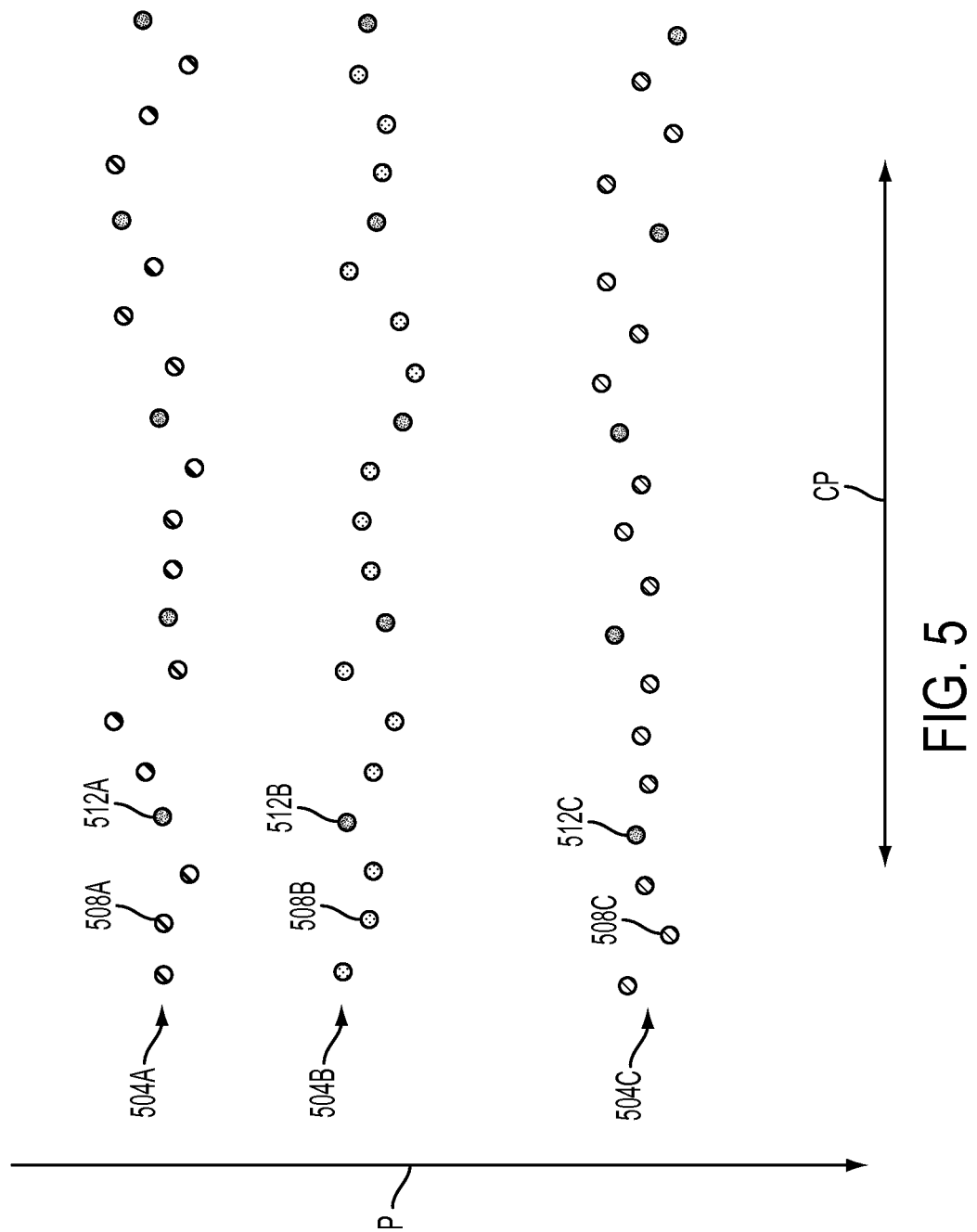
FIG. 5 is a depiction of ink drops arranged with a sparse pattern as part of the test patterns of FIG. 3 and FIG. 4.

FIG. 5 depicts an arrangement of ink drops in test patterns that are part of the control pattern formed on the image receiving surface. The image data for the control patterns include pixels corresponding to the test patterns depicted in FIG. 5 or other similar test patterns. In FIG. 5, the cyan test pattern 504A is a sparse test pattern where the inkjets eject individual ink drops that are separated from other marks in the test pattern and the test pattern has low density. The cyan ink test pattern 504A includes a plurality of cyan ink drops, such as ink drop 508A, that are separated from each other by a predetermined distance in the cross-process direction CP and also separated by varying distances in the process direction P. The test pattern 504 also includes drops of black ink, such as ink drop 512A, that are arranged in the test pattern 504A at regular intervals in the cross-process direction CP. During an inoperable inkjet detection process, the black ink drops act as references for locating the cyan ink drops relative to the black ink drops in the test pattern In addition to the cyan ink test pattern 504A, FIG. 5 depicts a test pattern 504B corresponding to magenta ink drops, such as ink drop 508B, interspersed with black ink drops, such as ink drop 512B, and a test pattern 504C corresponding to yellow ink drops, such as ink drop 508C, interspersed with black ink drops, such as ink drop 512C. These three patterns taken together sample and equal number of cyan, magenta, yellow, and black ink drops. Because black ink drops are a reference in the three patterns 504A-504C, the registration between any two printheads in the printhead modules 34A-34H can be inferred from the cross-process direction locations of the black ink drops and the color ink drops in the test patterns. In addition to the test patterns that are depicted in FIG. 5, other triplets of cyan/black, magenta/black, and yellow/black patterns include subsets of all the other inkjets available on the cyan, magenta, yellow, and black printheads. While the patterns of ink drops in the test patterns in FIG. 5 are visible to the optical sensor 94 in the printer 10 and are potentially perceptible to a human observer, the overall arrangement of ink drops in the control pattern reduces or eliminates the perceptibility of the printed test patterns to the human observers.

Figure 6:
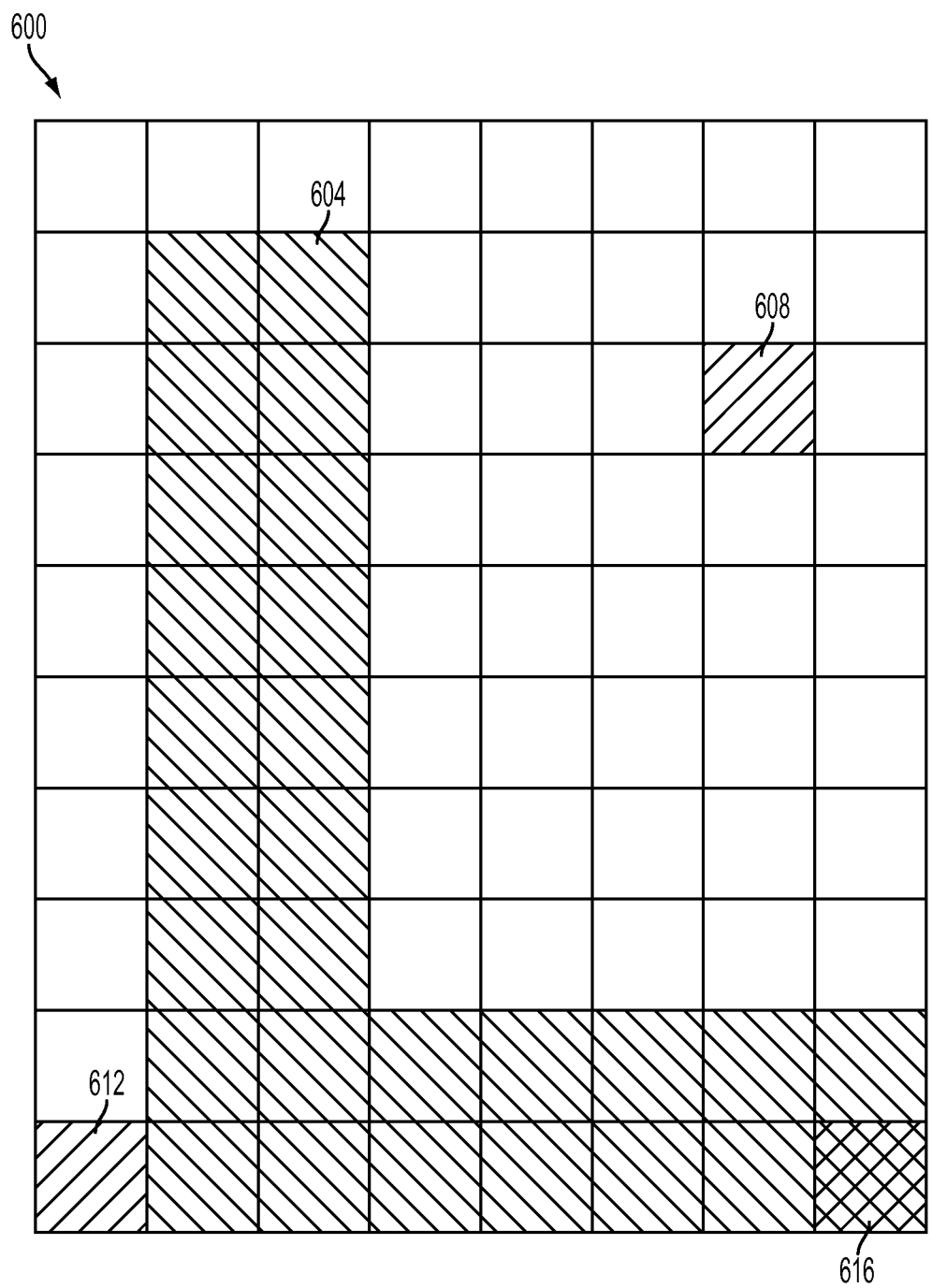
FIG. 6 is a diagram depicting digital image data including image data pixels corresponding to an ink image and to a control pattern prior to printing the ink image and the control pattern.

Referring again to FIG. 1, during process 100 the controller 80 optionally overrides pixels in the control pattern image data that overlap or are within a predetermined distance of image data pixels corresponding to the printed ink image (block 108). For example, FIG. 6 depicts a set of pixels 600 that form a portion of the image data for a printed page in a print job. The pixels 604 are a portion of the image data for the printed image that is formed as part of the print job. The pixels 608, 612, and 616 are each pixels that correspond to the control pattern. The reader should note that, for illustrative purposes, FIG. 6 depicts the pixels in the control pattern with a higher density than is common in practical embodiments. In FIG. 6, the pixel 608 in the control pattern is separated from the image data pixels 604, the pixel 612 is adjacent to pixels in the image data 604, and the pixel 616 corresponds to both the image data 604 and the control pattern.

In one embodiment, the controller 80 deactivates the image data corresponding to the control pattern in the pixel 616 so that the only ink drop ejected in the location of the image receiving surface corresponding to the pixel 616 is an ink drop corresponding to the image data 604. In another embodiment, the controller 80 also deactivates the pixel 612 that is adjacent to the pixels 604 in the printed image data, so that no ink drop is printed on the image receiving surface in the location corresponding to the pixel 612. In FIG. 6, the pixel 608 is separated from the pixels 604 in the image data, and the controller 80 ejects an ink drop onto the image receiving surface in the location corresponding to pixel 608 as part of the control pattern.

Referring again to FIG. 1, process 100 continues as the inkjets in the print zone eject ink drops onto the image receiving surface to form the control pattern, which includes the test pattern and the printed image during a print job (block 112). In the printer 10, the controller 80 generates firing signals for inkjets in each of the printhead modules 34A-34E form the control pattern and printed image on the image receiving surface 14. The controller 80 generates the firing signals for selected inkjets at selected times with reference to the combined image data that include the pixels corresponding to the control pattern and the printed image. The imaging drum 12 receives the ink drops and subsequently rotates through the transfix nip 18 as a media sheet enters the transfix nip 18, and the ink drops are transfixed to the media sheet.

During process 100, the image receiving member 12 rotates past the optical sensor 94 after the inkjets in the printhead modules 34A-34H form the printed ink image and the control pattern on the image receiving surface 14. As the image receiving surface 14 passes the optical sensor 94, one or more illumination sources in the optical sensor 94 are activated to shine light onto the image receiving surface 14 with a color that is complementary to the color of ink drops in the test pattern (block 116). As is known in the art, complementary colors are colors that contrast with one another.

In the printer 10, the optical sensor 94 activates one or more of the RGB light sources to increase the contrast with selected CMYK ink colors. The increased contrast enables the optical sensor 94 to generate scanned image data of the ink drops in the test pattern where the ink drops are detected with greater accuracy in the scanned image data. For example, in the CMYK printer 10, the optical sensor 94 activates the red light source to enhance detection of cyan test patterns, one of the blue or green light sources to enhance detection of magenta test patterns, the blue light source to enhance detection of yellow test patterns. The black drops of the test pattern are detected equally well with any combination of one or more of the three light sources. As described above with reference to FIG. 5, the test patterns for the cyan, magenta, and yellow inks include black ink drops that are used as references for identifying the test pattern. Black ink has a high contrast when printed on the surface of the image receiving member 12, and the optical sensor 94 generates image data that clearly depict the black ink drops using any of the red, green, and blue illumination sources.

During process 100, the optical sensor 94 generates scanned image data of the portion of the document zone on the image receiving surface 14 that includes the printed test pattern that is illuminated with the complementary light source (block 120). Unlike the image data described above with reference to the blocks 104 and 108, the scanned image data correspond to ink drops and other marks that are identified on the image receiving surface 14 after the inkjets in the printhead modules 34A-34H eject the ink drops to form the control pattern with the included test pattern. In the process 100, the printer 10 forms the test pattern entirely in the margin of the document zone, and the optical sensor 94 generates a two-dimensional arrangement of scanned image data including scanlines that correspond to the margin of the document zone that includes the test pattern. In the two-dimensional image data, each optical detector in the optical sensor 94 generates a single pixel of scanned image data in each scanline. The series of pixels generated by each optical detector in multiple scanlines is referred to as a "pixel column" that extends in the process direction, while each scanline extends in the cross-process direction.

During process 100, the controller 80 receives the scanned image data including scanned pixels corresponding to the ink drops in the test pattern on image receiving surface 14. As depicted in FIG. 5, the test patterns 504A-504C include ink drops that are arranged at regular intervals in the cross-process direction CP, but the ink drops are placed at varying locations in the process direction P. The variation in the process direction locations of the ink drops reduces the perceptibility of the test patterns, but also makes identification of the ink drops in scanned image data more difficult. Process 100 continues as the controller 80 sorts each pixel column in the scanned image data according to numeric reflectivity values for the scanned image data pixels (block 124).

As described above, the optical sensor 94 generates the scanned image data for the margin of the document zone and the ink drops in the test pattern. Each pixel in the scanned image data is assigned a numeric value based on the level of light reflected from the image receiving surface 14 and detected by the corresponding optical detector. In one embodiment, the reflectivity values are on an integer scale of 0 to 255, where 0 corresponds to black (lowest reflectivity) and 255 corresponds to white (highest reflectivity). The numeric reflectivity values are also referred to as "gray levels" where a gray level of 0 corresponds to black and a gray level of 255 corresponds to white, with intermediate values corresponding to an intermediate shade of gray. Blank regions of the image receiving surface 14 are more reflective than ink drops and have higher numeric reflectivity values while ink drops of various colors have lower reflectivity and lower numeric values in the scanned image data.

Figure 7:
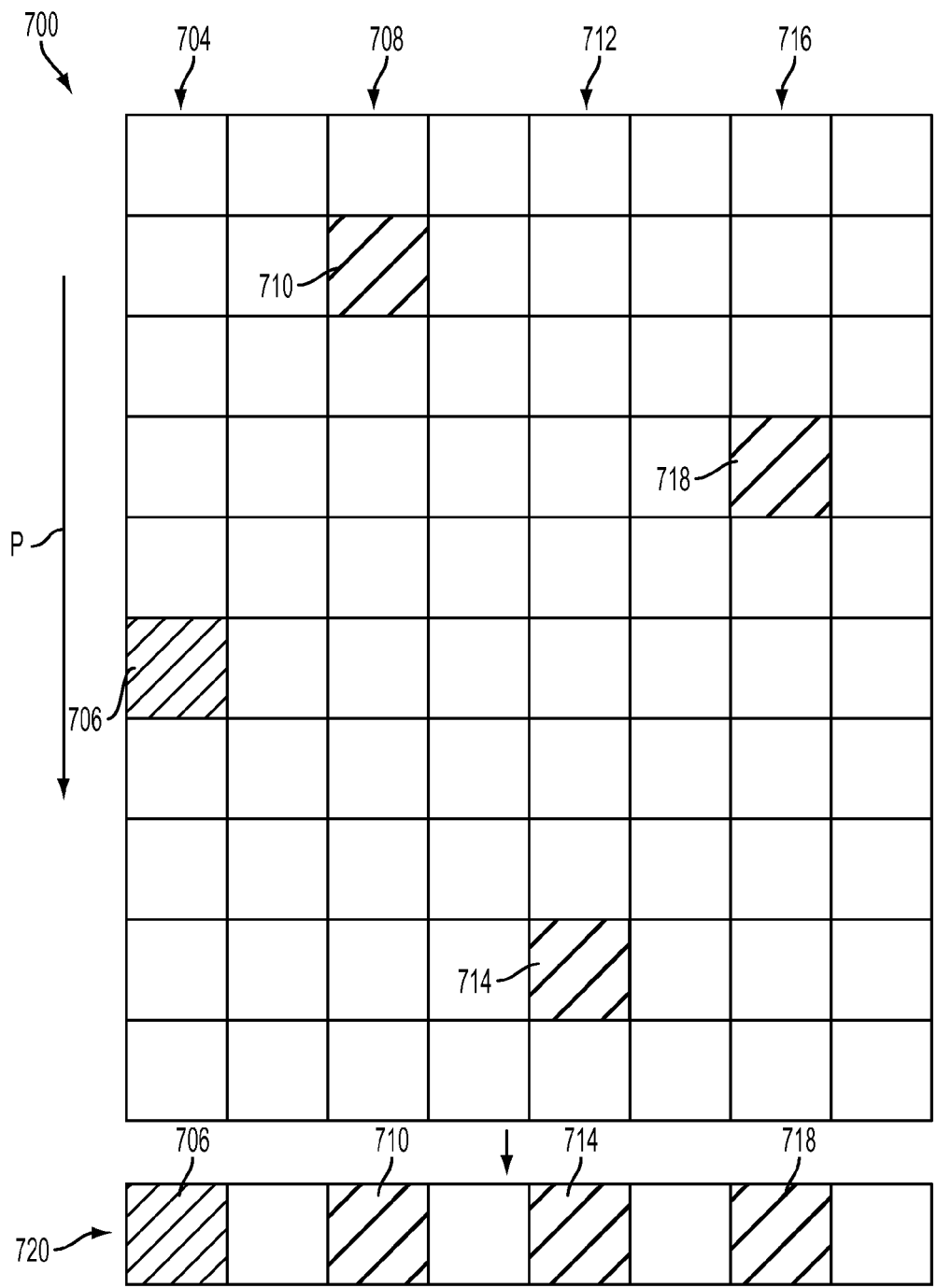
FIG. 7 is a diagram depicting image data generated from the image receiving surface including ink drops that are included in a test pattern.

The controller 80 sorts each pixel column based on reflectivity to generate a single row of pixels in the scanned image data with the minimum reflectivity value from each column. For example, as depicted in FIG. 7, the two-dimensional scanned image data 700 include pixel columns 704, 708, 712, and 716. Some of the pixel columns include pixels with reflectivity values that correspond to ink drops formed on the image receiving surface 14, while the majority of the pixels in the scanned image data 700 have high reflectivity values that correspond to the blank image receiving surface 14. For example, the pixel columns 704, 708, 712, and 716 include pixels 706, 710, 714, and 718, respectively, which correspond to a printed ink drop. In FIG. 7, the pixel 706 corresponds to a drop of black ink, while the pixels 710, 714, and 718 correspond to drops of another ink color, such as cyan, magenta, and yellow. The controller 80 sorts each of the pixel columns in the image data to form the single pixel row 720 that includes the pixels 706, 710, 714, and 718 that depict the ink drops formed in the test pattern, even though the ink drops are not printed in the same location in the process direction.

Referring again to FIG. 1, in one configuration of the process 100 the controller 80 identifies the locations of ink drops in the test pattern with reference to the sorted scanned image data and identifies one or more performance parameters for the inkjets and printheads that ejected the ink drops depicted in the scanned image data (block 128). For example, in one configuration the controller 80 identifies inoperable inkjets if one or more ink drops are absent from the test pattern. In the test patterns 504A-504C depicted in FIG. 5, the ink drops are arranged at regular intervals in the cross-process direction. The controller 80 identifies missing ink drops with a comparison of the value of the gray level in the pixels 706, 710, 714, or 718 to a predetermined gray level threshold. If the gray level is lower than the threshold then the inkjet is identified as operating normally, but if the gray level is higher than the threshold then the inkjet is identified as being inoperable.

In another configuration, a performance parameter identified during process 100 corresponds to the alignment and registration of printheads in the printhead modules 34A-34H. In one embodiment of the process 100, the locations of ink drops in the printed test pattern are used to register different printheads in the printhead modules 34A-34H in addition to or instead of identifying inoperable inkjets (block 128). For example, the reference black ink drops 512A-512C depicted in FIG. 5 are each ejected by a single inkjet in a single black ink reference printhead. The relative distance between the black ink drops and color ink drops, such as the color ink drops 508A, 508B, and 508C, in the cross-process direction CP enables the controller 80 to identify a cross-process direction offset between the printheads that form each of the test patterns 504A-504C. Additionally, the controller 80 identifies deviations from the expected locations of ink drops in the binary image data for the test pattern and the identified process direction locations of the ink drops in the scanned image data to identify an offset between the printheads in the process direction. The controller 80 operates one or more actuators to move the printheads to register the printheads in the cross-process direction and adjusts the timing of operation for the inkjets in the printheads to register the printheads in the process direction after identification of registration errors using the scanned image data that are generated in the process 100. In addition to the inoperable inkjet and printhead registration performance parameters that are described above, the image data that are generated in process 100 are further used in identifying performance parameters for other operations in the printer including generation of intensity measurements and dot spread temperature control for the ink drops that are printed in the control pattern.

As described above, process 100 is performed during a print job in which the printer 10 forms printed images on media sheets and identifies inoperable inkjets in the printhead modules 34A-34H. For each printed document zone, the process 100 typically only prints a single test pattern or a small number of test patterns in the document zone to identify inoperable inkjets in a subset of the total number of inkjets in the print zone. During the print job, the controller 80 prints different sets of test patterns as the printer 10 forms images in a series of document zones to verify the operability of each of the inkjets in the printhead modules 34A-34H periodically during a print job. If the controller 80 identifies an inoperable inkjet, then the controller 80 applies one or more jet substitution techniques that are known to the art to reduce the visual impact of the inoperable inkjet on the printed images.

In the embodiment of the printer 10, the controller 80 generates multiple test patterns in a series of print zones to test the operability of all the inkjets and to perform registration between printheads in the printhead modules 34A-34H. In the printer 10, each document zone only includes test patterns and a control pattern that is formed from a subset of the inkjets because if each of the inkjets in the printhead modules 34A-34H were to eject an ink drop on a single document zone, the resulting pattern would be perceptible to a human observer. Alternative printer configurations form printed images using a substantially smaller number of inkjets than are present in the printer 10. For example, a multi-pass printer uses a smaller number of inkjets to form printed images by rotating an imaging drum past the printheads multiple times to form an ink image using a smaller number of inkjets. In alternative printer embodiments that include fewer inkjets than the printer 10, sparse test patterns and control patterns that include an ink drop from each inkjet in the printer are formed in a single document zone during process 100.

Figure 2:
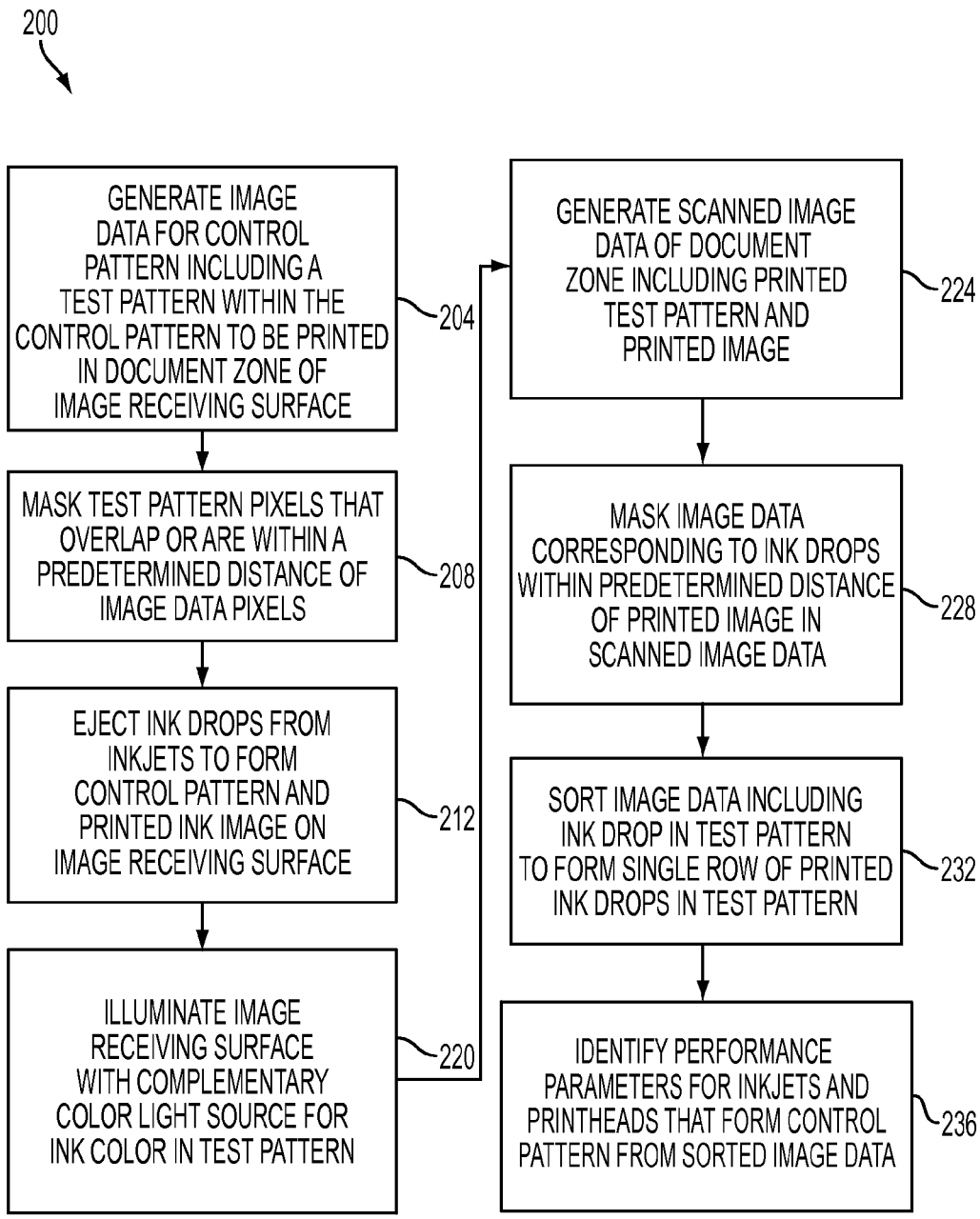
FIG. 2 is a block diagram of a process for identifying an inoperable inkjet in a printed pattern of ink drops formed in a margin and within an area of a printed image on an image receiving surface.

FIG. 2 depicts another process 200 for identification of one or more performance parameters for inkjets and printheads in an inkjet printer. An inkjet printer performs the process 200 to identify inoperable inkjets in a print zone during a print job as with the process 100, but the process 200 includes test patterns that partially or fully overlap the region of the document zone that includes the printed ink image. Printing the test pattern in regions that overlap the printed ink image enables an inkjet printer to form the test pattern over a larger region of the document zone, which can reduce the perceptibility of the printed test pattern and enable use of a control pattern with a lower pixel density to reduce the perceptibility of the printed test pattern. In the description below, a reference to the process 200 performing or doing some function or action refers to one or more controllers or processors that are configured with programmed instructions to implement the process performing the function or action or operating one or more components to perform the function or action. Process 200 is described with reference to the printer 10 of FIG. 8 for illustrative purposes.

Figure 4:
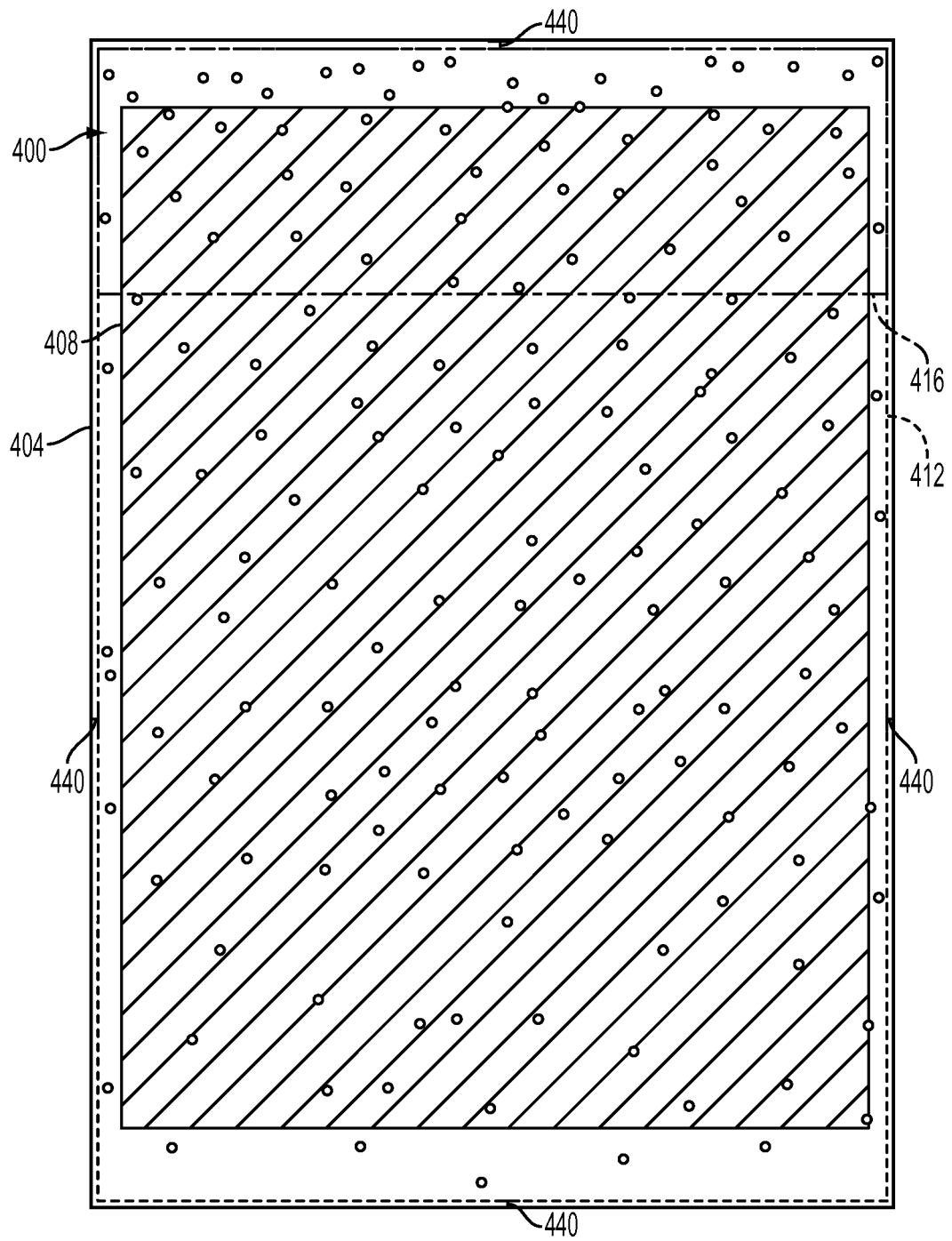
FIG. 4 is a diagram depicting a control pattern including image data corresponding to ink drops formed on a document zone that includes a test pattern that overlaps a portion of a printed ink image.

Process 200 begins as the controller 80 generates image data for a control pattern that is printed in the document zone of an image receiving surface along with a printed ink image during a print job (block 204). In the process 200, the controller 80 generates the control pattern including image data pixels that correspond to a test pattern. In the process 200, at least a portion of the test pattern extends into regions of the document zone that correspond to the printed ink image instead of being located only in the margins of the document zone. For example, as depicted in FIG. 4, a control pattern 412 is arranged in document zone 404 that is formed on a portion 400 of the image receiving surface 14. A printed ink image occupies a region 408 on the document zone 404, and a region 416 in the control pattern 412 includes the test pattern. The region 416 including the test pattern overlaps a portion of the image region 408. In FIG. 4, the controller 80 forms the region including the control pattern 412 with a small gap, which is indicated by the dimension lines 440, between the edges of the control pattern 412 and the edges of the document zone 404. The gap, which is approximately 2 mm in one embodiment, ensures that ink drops in the control pattern 412 remain within the document zone 404 and are transferred to the print medium during the transfix process instead of transferring from the image receiving surface 14 to the transfix roller 19.

In the embodiment of FIG. 4, the image data corresponding to the control pattern 412 are formed with a density gradient. The density of pixels in the control pattern 412 is greatest in the region 416 at the top of the test pattern the test pattern, and gradually decreases toward the bottom of the document zone 404. In an alternative embodiment, a similar test pattern is located near the bottom of the document zone 404. The rate of change in the pixel density for the control pattern 412 is lower than a predetermined threshold where the gradient becomes perceptible to human observers. For example, in one embodiment the density of the test pattern changes at a rate of less than 0.02 L*/mm in the process direction P, where L* is the CIELAB unit of luminosity. In another embodiment, the density of pixels and printed ink drops in the control pattern 412 is substantially uniform throughout the document zone 404.

In the configuration of FIG. 4, some of the pixels in the image data corresponding to the test pattern do not interfere with pixels in the printed ink image that is formed in the region 408. In other instances, however, the printed ink image interferes with the identification of some ink drops that are part of the test pattern. As described below, in one embodiment the controller 80 identifies overlap between the image data corresponding to the test pattern and the image data in the printed image before printing to the document zone. In another embodiment the controller 80 identifies overlap between the ink drops in the test pattern and the printed image using scanned image data that are generated after the control pattern and printed ink image are formed on an image receiving surface.

Referring again to FIG. 2, process 200 continues in one embodiment as the controller 80 masks test pattern pixels that overlap or are within a predetermined distance of image data pixels in the printed ink image (block 208). The controller 80 does not print ink drops for pixels in the test pattern that overlap or are proximate to image data pixels in the printed image. For example, in FIG. 6 the test pattern pixel 616 overlaps the image data pixels 604, and the test pattern pixel 612 is adjacent to the image data pixels 604. The test pattern pixel 608 is, however, within the region of the document zone that receives the printed image but is sufficiently separated from the pixels in the image data to be used in forming and analyzing the test pattern. The controller 80 masks the inkjets that correspond to the portions of the test pattern that are not printed so that the inkjets are not identified as being inoperable. In some embodiments, if an inkjet cannot be tested due to overlap with image data of a printed image, then the printer 10 modifies the test pattern to remove the conflict or uses the same test pattern with a different printed ink image that does not conflict with the test pattern.

Process 200 continues as the controller 80 generates firing signals for the printhead modules 34A-34D to eject ink drops to form the control pattern and the printed ink image on the image receiving surface (block 212), the optical sensor 94 illuminates the image receiving surface 14 with a light color that complements the color of ink in the test pattern (block 220), and the optical scanner 94 generates two-dimensional scanned image data corresponding to the portion of the document zone on the image receiving surface 14 that includes the test pattern (block 224). In process 200, the processing described with reference to blocks 212-224 is performed in a similar manner as described above with reference to the processing of blocks 112-124, respectively. The processing described with reference to block 224 differs from the processing described in block 124, however, because the optical sensor 94 generates scanned image data corresponding to both the printed test pattern and to a portion of the printed ink image because the test pattern overlaps the region of the document zone that includes the printed ink image.

Process 200 continues as the controller 80 identifies printed ink drops in the test pattern in the scanned image data and identifies whether one or more inkjets are inoperable if the scanned image data indicate than an ink drop is absent from the test pattern. As described above in the processing of block 208, the controller 80 identifies masked inkjets with reference to the image data before printing the test pattern in one embodiment. In an embodiment where inkjets are masked prior to forming the printed image, the controller 80 continues by sorting the scanned image data pixels corresponding to the test pattern (block 232) and identifying inoperable inkjets corresponding to ink drops that are absent from the scanned image data or registering printheads in the printhead modules 34A-34H (block 236). As described above, the controller 80 ignores inkjets that correspond to ink drops in the test pattern that overlap or are proximate to the printed image. Additionally, the sorted image data in pixel columns that are outside of the printed test pattern may include reflectivity values that correspond to the printed ink image instead of the blank image receiving surface 14. The controller 80 optionally performs additional filtering in the image data to ignore pixels in the sorted image data that correspond to the printed image in regions of the document zone on the image receiving surface 14 that are outside of the test pattern.

In another embodiment of process 200, the controller 80 identifies whether ink drops in the test pattern overlap or are within a predetermined distance of ink drops in the scanned image data after the control pattern and test pattern are printed instead of before the control pattern and test pattern are printed (block 228). For example, in one embodiment the controller 80 sorts the pixel columns from the lowest gray level to the highest gray level. For example, in one situation a pixel column of scanned image data includes pixels having gray levels where more than 1 pixel in the printed ink image is in the region 416, including at least one pixel corresponding to a printed ink drop in the image 408. For this situation, multiple pixels in the pixel column have a gray level that is less than the threshold, including the pixel corresponding to the ink drop in the test pattern and to one or more ink drops in the printed image. The index of the threshold that contains a gray level less than the threshold depends on the number of pixels in the printed ink image in the region 416. For all pixel columns where the threshold of a scan line greater than 1 is below the threshold is chosen as invalid for determining a test pattern drop position. The remaining pixel columns correspond to regions of the scanned image data that correspond to blank portions of the document zone or to ink drops in the test pattern that are separated from the printed ink image. The controller 80 sorts the image data in the unmasked pixel columns (block 232) and identifies one or more performance parameters for the inkjets and printheads that eject the control pattern ink drops that are depicted in the unmasked sorted scanned image data (block 236). In process 200, the controller 80 performs the processing of block 236 in substantially the same manner as described above with reference to the processing of block 128 in FIG. 1.

While the processes 100 and 200 are described in association with the indirect inkjet printer 10 for illustrative purposes, alternative printer embodiments can also employ the processes 100 and 200. For example, direct inkjet printers print ink images directly onto individual media sheets or onto elongated media rolls that are subsequently cut into individual pages. Direct inkjet printers can also use the processes 100 and 200 to form sparse test patterns and control patterns that are imperceptible to human observers while enabling the printers to identify inoperable inkjets, perform printhead registration, and perform other printer calibration and diagnostic functions during a print job.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for operating an inkjet printer comprising:
operating a plurality of inkjets with a plurality of firing signals generated by a controller to eject ink drops of a first color into a margin portion and an ink image portion of a document zone on an image receiving surface to impose a control pattern in both the ink image portion and the margin portion of the document zone on the image receiving surface and to eject ink drops into the image portion of the document zone on the image receiving surface to form an ink image in the ink image portion only of the document zone on the image receiving surface with reference to electronic image data, a density of the control pattern in both the ink image portion and the margin portion of the document zone on the image receiving surface being configured to change at a rate that is at or less than a predetermined threshold to render the control pattern in both the ink image and the margin portions of the document zone imperceptible to a human observer;
generating with an optical sensor scanned image data of a portion of the control pattern on the image receiving surface; and
identifying with the controller referencing the generated scanned image data received from the optical sensor a performance parameter corresponding to
an inkjet in the plurality of inkjets or a printhead including at least one inkjet in the plurality of inkjets.

2. The method of claim 1, the identification of the performance parameter further comprising:
identifying with the controller referencing the generated scanned image data received from the optical sensor a position of an ink drop in the portion of the control pattern on the image receiving surface;
identifying with the controller referencing the generated scanned image data received from the optical sensor that another ink drop is absent from the control pattern with reference to the identified position of the ink drop; and
identifying with the controller an inoperable inkjet in the plurality of inkjets in response to identifying the absent ink drop.

3. The method of claim 1 wherein the predetermined threshold is 0.02 L*/mm.

4. The method of claim 1 wherein a portion of the control pattern forms a test pattern.

5. The method of claim 2 further comprising:
detecting with the controller referencing the generated scanned image data received from the optical sensor an ink drop ejected for the control pattern is within the ink image; and
ignoring ink drops detected as being within the ink image in the identification of one of an ink drop position and an absent ink drop with the controller.

6. The method of claim 1 further comprising:
operating the plurality of inkjets with the plurality of firing signals generated by the controller to eject only one ink drop from each operated inkjet to form the control pattern on the image receiving surface.

7. The method of claim 1 further comprising:
operating another plurality of inkjets with another plurality of firing signals generated by the controller to eject ink drops of a second color in the control pattern.

8. The method of claim 7, the generation with the optical sensor of the scanned image data of the control pattern on the image receiving surface further comprising:
illuminating the image receiving surface with a light source activated by a controller to emit light having a complementary color to the ink drops having the first color; and
generating the scanned image data with an optical detector in the optical sensor, the optical detector being configured to receive the light reflected from the image receiving surface and the ink drops ejected onto the image receiving surface to generate the scanned image data with an increased contrast between scanned image data corresponding to the ink drops having the first color and the scanned image data corresponding to the image receiving surface.

9. The method of claim 8 wherein the first color is yellow and the second color is black; and
the complementary light color is blue.

10. The method of claim 8 wherein the first color is magenta and the second color is black; and
the complementary light color is one of blue and green.

11. The method of claim 8 wherein the first color is cyan and the second color is black; and
the complementary light color is red.

12. The method of claim 1 further comprising:
operating another plurality of inkjets in a printhead other than a printhead in which the first plurality of inkjets are located with a second plurality of firing signals generated by the controller to eject ink drops having a second color, the ink drops having the second color being interleaved with the ink drops having the first color; and
identifying with the controller the performance parameter as an offset between a cross-process direction location of the printhead in which the first plurality of inkjets are located relative to the printhead in which the other plurality of inkjets are located with reference to a cross-process direction offset between scanned image data corresponding to the ink drops having the first color and the ink drops having the second color.

13. The method of claim 12 wherein the inkjets in the second printhead eject black ink drops.

14. An inkjet printer comprising:
a plurality of inkjets configured to eject ink drops in a margin portion and an ink image portion of a document zone on an image receiving surface;
an optical sensor configured to generate scanned image data corresponding to light reflected from the image receiving surface and from ink drops in both the margin portion and the ink image portion of the document zone on the image receiving surface;
a controller operatively connected to the plurality of inkjets and the optical sensor, the controller being configured to:
generate a plurality of firing signals for the plurality of inkjets to eject ink drops of a first color into the ink image portion and the margin portion of the document zone on the image receiving surface to impose a control pattern in both the ink image portion and the margin portion of the document zone on the image receiving surface and to eject ink drops into the ink image portion of the document zone on the image receiving surface to form an ink image in the ink image portion only of the document zone on the image receiving surface with reference to electronic image data, a density of the control pattern in both the ink image portion and the margin portion of the document zone on the ink receiving surface being configured to change at a rate that is at or less than a predetermined threshold to render the control pattern in both the ink image and margin portions of the document zone imperceptible to a human observer;

receive scanned image data generated by the optical sensor that corresponds to a portion of the control pattern on the image receiving surface; and identify with reference to the generated scanned image data received from the optical sensor a performance parameter corresponding to an inkjet in the plurality of inkjets or a printhead including at least one inkjet in the plurality of inkjets.

15. The printer of claim 14, the controller being further configured to:

identify a position of an ink drop in the portion of the control pattern on the image receiving surface with reference to the generated scanned image data received from the optical sensor;

identify that another ink drop is absent from the control pattern with reference to the identified position of the ink drop with reference to the generated scanned image data received from the optical sensor; and identify an inoperable inkjet in the plurality of inkjets in response to identification of the absent ink drop.

16. The printer of claim 14 wherein the predetermined threshold is 0.02 L*/mm.

17. The printer of claim 14 wherein a portion of the control pattern forms a test pattern.

18. The printer of claim 15, the controller being further configured to:

detect with reference to the generated scanned image data received from the optical sensor an ink drop ejected for the control pattern is within the ink image; and ignore ink drops detected as being within the ink image in the identification of one of an ink drop position and an absent ink drop.

19. The printer of claim 14, the controller being further configured to:

generate a plurality of firing signals to operate the plurality of inkjets to eject only one ink drop from each operated inkjet to form the control pattern on the image receiving surface.

20. The printer of claim 14, the controller being further configured to:

operating another plurality of inkjets to eject ink drops of a second color in the control pattern.

21. The printer of claim 20, the controller being further configured to:

activate a light source associated with the optical sensor to illuminate the image receiving surface with light having a complementary light color to the ink drops having the first color; and receive the scanned image data generated by an optical detector in the optical sensor, the optical detector being configured to receive the light reflected from the image receiving surface and the light reflected by the ink drops ejected onto the image receiving surface and generate the scanned image data with an increased contrast between the scanned image data corresponding to the ink drops having the first color and the scanned image data corresponding to the image receiving surface.

22. The printer of claim 21 wherein the first color is yellow and the second color is black; and the complementary light color is blue.

23. The printer of claim 21 wherein the first color is magenta and the second color is black; and the complementary light color is one of blue and green.

24. The printer of claim 21 wherein the first color is cyan and the second color is black; and the complementary light color is red.

25. The printer of claim 14, the controller being further configured to:

generate a plurality of firing signals for a second plurality of inkjets in a printhead other than a printhead in which the first plurality of inkjets are located to eject the ink drops having a second color, the ink drops having the second color being interleaved with the ink drops having the first color; and identify a cross-process direction location of the printhead in which the first plurality of inkjets are located relative to the printhead in which the second plurality of inkjets are located with reference to a cross-process direction offset between scanned image data corresponding to the ink drops having the first color and the ink drops having the second color.

26. The printer of claim 25 wherein the inkjets in the second printhead eject black ink drops.

* * * * *